(19) United States Patent
Bross

[11] 4,126,122
[45] Nov. 21, 1978

[54] SOLAR HOT WATER BOOSTER AND EXCHANGER FOR USE THEREIN

[76] Inventor: Theodore D. Bross, 62 High Ridge Rd., West Hartford, Conn. 06117

[21] Appl. No.: 761,964

[22] Filed: Jan. 24, 1977

[51] Int. Cl.² .............................................. F24J 3/02
[52] U.S. Cl. .................................. 126/271; 237/1 A; 126/400
[58] Field of Search ..................... 126/270, 271, 400; 237/1 A; 165/179, 132, 74, 75; 122/32; 138/123, 178

[56] References Cited

U.S. PATENT DOCUMENTS

| | | | |
|---|---|---|---|
| 1,057,505 | 4/1913 | Smith | 138/173 X |
| 1,280,656 | 10/1918 | Buhr | 122/32 |
| 1,328,608 | 1/1920 | Woodward | 122/32 |
| 1,649,097 | 11/1927 | Bryant | 122/32 |
| 1,889,238 | 11/1932 | Clark | 126/271 |
| 2,544,474 | 3/1951 | Swanton, Jr. | 126/271 X |
| 3,250,269 | 5/1966 | Sherock | 126/271 |
| 3,906,928 | 9/1975 | Wright | 126/271 |
| 3,980,071 | 9/1976 | Barber, Jr. | 237/1 A |
| 3,998,207 | 12/1976 | Watt | 126/271 |

Primary Examiner—William F. O'Dea
Assistant Examiner—Larry Jones

[57] ABSTRACT

A solar powered heater system which may be employed to preheat water in or prior to delivery to a conventional hot water heater. The solar powered heater system includes a heat exchanger which is formed from a tube having a contoured surface. This tubular heat exchanger is inserted in a tank through which the liquid to be heated passes. The heat exchanger is part of a closed loop, through which a heat transfer fluid is circulated, which includes an array of solar collectors. The heat transfer fluid may either be bypassed around the heat exchanger or caused to stop circulating when insufficiently heated by the solar energy.

7 Claims, 3 Drawing Figures

SOLAR HOT WATER BOOSTER AND EXCHANGER FOR USE THEREIN

BACKGROUND OF THE INVENTION (1) Field of the Invention

The present invention relates to the heating of fluids and particularly to the heating of water for domestic purposes with the aid of solar energy. More specifically, this invention is directed to solar assisted hot water heating systems and to heat exchangers for use therein. Accordingly, the general objects of the present invention are to provide novel and improved methods and apparatus of such character.

(2) Description of the Prior Art

While not limited thereto in its utility, the present invention is believed to be particularly well suited for use in the preheating of cold water prior to its delivery to a domestic hot water heater or in the supplementary heating of fluid within the tank of a hot water heater. The hot water heating systems presently in use include separate heating tanks equipped either with one or more electric heating elements or a burner which is fired with a hydrocarbon fuel. There are, additionally, so called "domestic" hot water heating systems which include a heat exchanger integral with a boiler employed to produce hot water or steam for residential heating purposes. In all hot water heating systems previously commerically available, cold water, for example from the city supply, was delivered directly to the heating apparatus and the sole source of thermal energy for heating the water was derived, either directly or indirectly, from the combustion of a hydrocarbon fuel.

Because of rapidly escalating energy costs, it has been proposed to reduce energy consumption needed for the production of hot water for domestic purposes by means of preheating the water prior to its delivery to the hot water heater. Numerous preheating schemes, in various degrees of complexity and practicality, have been proposed. These preheating schemes may be classified as either those which seek to recover thermal energy which would otherwise be wasted, for example through installation of some form of heat exchanger in the exhaust stack from the building heating furnance, and those which collect and employ solar energy. The waste heat recovery schemes proposed to date have been characterized by complexity, difficulty in installation and their reliability has been suspect. The preheating schemes based upon the use of solar energy have included the generation of electrical energy for use in energizing heating elements, for example through the use of windmills or solar cells, or have utilized solar energy for the purposes of directly heating fluid. Because of the notorious inability to store electrical power, the proposed preheating schemes based upon the generation of electrical energy for delivery to an electric heating element have proved to be impractical. Previously proposed schemes for using solar energy to directly heat a fluid have been characterized by a number of inherent deficiencies. These deficiencies include poor efficiency, which has made the necessary investment in capital equipment unattractive, and complex control schemes which have significantly increased the cost of the equipment which must be acquired.

SUMMARY OF THE INVENTION

The present invention overcomes the above briefly discussed and other deficiencies and disadvantags of the prior art by providing a novel and improved technique and apparatus for the utilization of solar energy to boost the thermal energy content of and/or preheat a fluid. In accordance with the invention, a heat transfer fluid is circulated through a closed loop which includes a heat exchanger and a solar energy collector. The pump employed to circulate the heat transfer fluid through this closed loop is energized only when the temperature of the fluid within the solar energy collector is above a predetermined level. The circulating heat transfer fluid will be bypassed around the heat exchanger, as its enthalpy increases, until such time as the transfer fluid reaches a temperature which exceeds by a predetermined amount the temperature of the fluid to which energy is to be transferred via the heat exchanger.

Pursuant to one embodiment of the invention, the heat exchanger is positioned within the tank of a hot water heater and the hot water heater is provided with a source of thermal energy such as, for example, one or more electric heating elements. These electric heating elements will be energized only when the temperature of the fluid within the hot water heater tank drops below a preselected level and the heating elements will be deenergized when the tank fluid temperature exceeds a preselected level. Since the temperature of the water drawn from the tank for use may exceed the predetermined level because of the combined action of the heat exchanger and heating elements, a tempering valve may be provided at the outlet of the tank for mixing cold fluid with the heated fluid as necessary to maintain the temperature of fluid withdrawn from the heating system within the desired range.

In accordance with another embodiment of the invention, the heat exchanger is positioned within a small tank upstream, in the direction of flow of the incoming cold fluid, with respect to the main hot water heater and the main hot water heater functions in the ordinary manner.

In accordance with a preferred embodiment of the invention, the heat exchanger comprises a "spiral" tube. The heat transfer fluid is delivered to this "spiral" tube at the top thereof and, because of the configuration of the walls of the tube, spirals downwardly therethrough for subsequent withdrawal and return to the solar collector from the vicinity of the bottom of the tube. The "spiral" tube is secured to a flange and removably mounted through the top of the tank through which the fluid to be heated passes. The intake and outlet tubes for the heat transfer fluid pass through this mounting flange. The heat exchanger may be removed from the tank merely by unbolting the flange to which the "spiral" tube is secured from a further annular flange which is affixed to the tank about the opening through which the heat exchanger is inserted.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PEFERRED EMBODIMENTS

Figure 1:
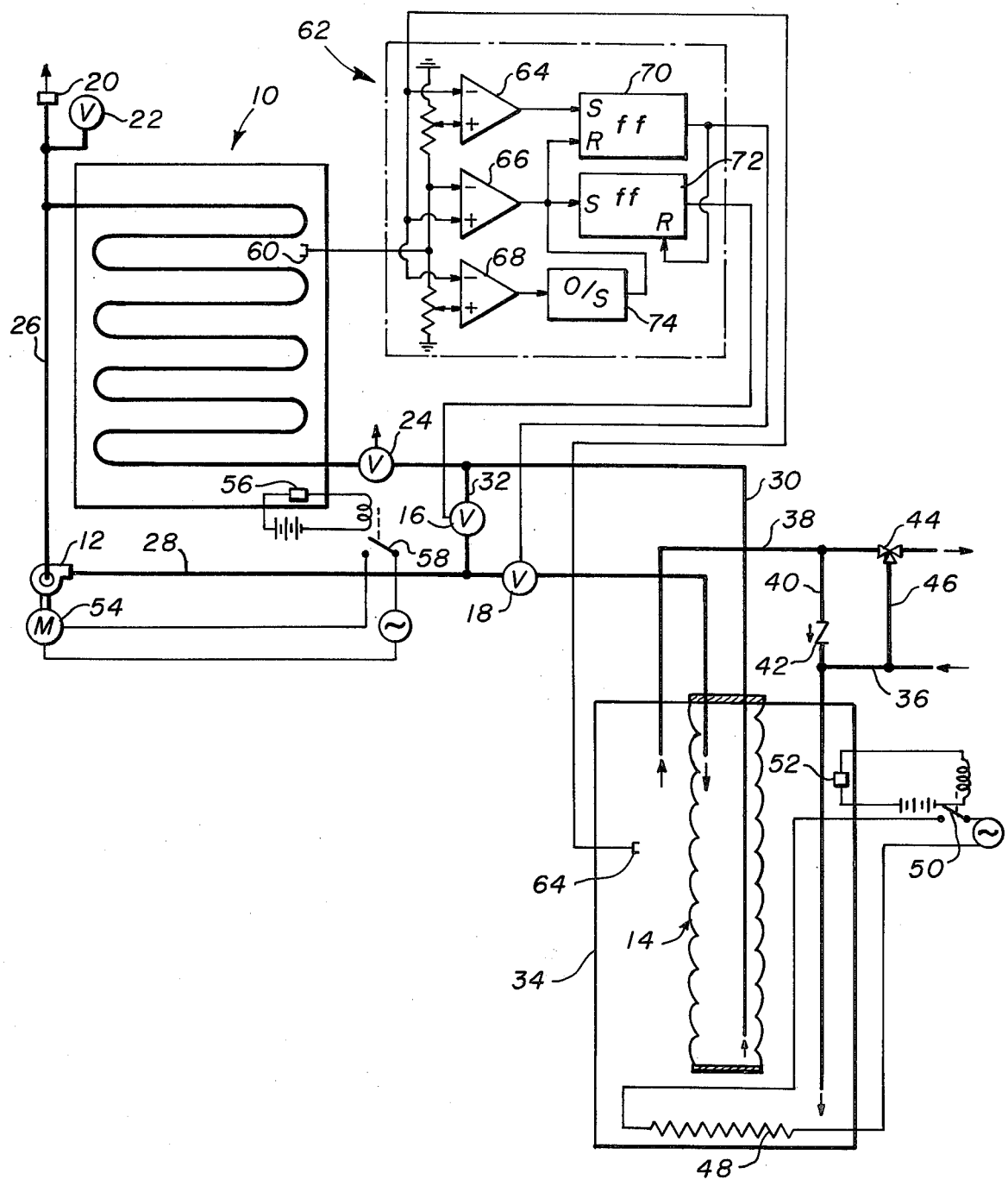
FIG. 1 is a schematic illustration of a solar assisted hot water booster system in accordance with a first embodiment of the present invention.

With reference to FIG. 1, a solar energy collector is indicated schematically and generally at 10. Solar collector 10 may comprise any commercially available device for concentrating the sun's energy on a conduit through which a fluid, typically a liquid, is circulated. Thus, by way of example, solar collector 10 may comprise an array of flat plate collectors formed from a suitable metal, for example aluminum, which are provided with heat absorbing surface coating and covered with a glazing. The collectors may be connected in series, as schematically illustrated in FIG. 1, or any suitable series-parallel arrangement may be employed. The fluid flow path through collector 10 forms part of a closed circuit through which a heat transfer fluid will be circulated by means of a circulator pump 12. The heat transfer fluid may be water, propylene glycol with diproplyene glycol and water or any other suitable liquid. The solar collector 10 will, of course, be positioned in the most appropriate orientation so as to receive the rays of the sun. It is possible, through the use of existing technology, to re-aim the solar collector 10 either manually or automatically as the angle of inclination of the sun varies seasonally.

The closed loop for the heat transfer fluid includes, in addition to the solar collector 10 and pump 12, a heat exchanger which has been indicated generally at 14. The structural details of heat exchanger 14 will be discussed in greater detail below in the description of FIG. 3. The heat transfer fluid loop also includes a pair of solenoid operated valves 16 and 18. Additionally, the heat transfer fluid loop employs an air vent 20 and a pair of pressure relief valves 22 and 24. Fluid communication between the solar collector 10 and pump 12 is via conduit 26 while fluid communication between pump 12 and heat exchanger 14 is via a conduit 28. The return path from heat exchanger 14 to solar collector 10 is via a conduit 30. Valve 18 is mounted in conduit 28 while valve 16 is installed in a branch conduit 32 which, for the purposes to be described below, interconnects conduits 28 and 30 when valve 16 is open to thereby "short-circuit" heat exchanger 14.

Heat exchanger 14 is, in the embodiment of FIG. 1, mounted within the tank 34 of the hot water heater. Cold water is delivered to the interior of tank 34, adjacent the bottom of the tank, via a conduit 36 and heated water is withdrawn from the vicinity of the top of tank 34 via conduit 38. In the manner known in the art, a branch conduit 40 including a check valve 42 interconnects conduits 36 and 38. A tempering valve 44 may be connected in conduit 38 and be coupled to conduit 36 via a further conduit 46. Tempering valve 44 may be manually or thermostatically controlled so as to add a sufficient amount of incoming cold water to the heated water being drawn from tank 34 so as to insure that the temperature of the hot water in conduit 38 does not exceed a preselected maximum level.

There will not, of course, always be sufficient thermal energy transferred from heat exchanger 14 to the fluid in tank 34 to bring the temperature of the tank fluid up to a predetermined minimum level. Accordingly, tank 34 is provided with a heating device. While tank 34 could be the tank of a conventional gas or oil fired hot water heater, in FIG. 1 tank 34 is depicted as being an electric hot water heater which includes one or more electric heating elements such as the element indicated schematically at 48. Current is supplied to the electric heating element 48 via a thermostatically controlled solenoid operated switch 50 connected in the electricl power line. Switch 50, in the conventional manner, is operated in response to the temperature of the fluid in tank 34 as sensed by a suitable thermostat type sensor 52.

Control of the mode of operation of the above-described system, and particularly control over the energization of drive motor 54 for pump 12 and solenoid operated valves 16 and 18, will now be described. Motor 54 is energized in response to the sensing of the temperature of the heat transfer fluid within solar collector 10 by means of a temperature sensor 56. Temperature sensor 56 may be a thermostat which controls, in the conventional manner, a solenoid operated switch 58. The closing of switch 58 completes a circuit between an alternating current source and motor 54. The control will typically be adjusted such that motor 54 is energized to drive pump 12 whenever the temperature within collector 10 is above a preselected level such as, for example, 100° F. A second temperature sensor 60, which may be a thermistor, is also installed within collector 10 for measuring the temperature of the heat transfer fluid therein. Sensor 60 will provide an output voltage having a magnitude commensurate with the sensed temperature. This temperature related signal is delivered to a control circuit indicated generally at 62. A second input to control circuit 62 is provided by a further temperature sensor 64 which measures the temperature of the water in tank 34 and provides the signal having a magnitude which is directly related to the sensed temperature.

Control circuit 62 may take many forms and in the simplified version depicted in FIG. 1 includes differential amplifiers 64, 66 and 68, bistable circuits 70 and 72 and a monostable pulse generator 74. Solenoid operated valves 16 and 18 are normally closed and are respectively energized, so as to be switched to the open state, in response to the setting of respective flip-flops 70 and 72. Amplifier 66 will provide an output signal for the setting of flip-flop 72 whenever the temperature of the fluid in tank 34 is greater than the temperature of the fluid in collector 10. Amplifier 64 will provide a signal for the setting of flip-flop 70, and thus for the resetting of flip-flop 72, whenever the solar collector fluid temperature increases to the point where it exceeds the tank temperature by a preselected amount such as, for example 20° F. Amplifier 68 will provide a gating signal to the one-shot 74 when the temperature in collector 10 falls to the point where it exceeds the tank temperature by, for example, only 5° F. The output of the one-shot 74 causes the setting of flip-flop 72 and the resetting of flip-flop 70. Thus, upon the generation of an output signal by amplifier 66, valve 16 will be opened and valve 18 will remain closed. Upon generation of an output signal by amplifier 64, the state of both of valves 16 and 18 will be switched whereby valve 16 will be closed and valve 18 opened. Generation of an output pulse by one-shot 74, in response to a signal provided by amplifier 68, will reset both of valves 16 and 18 whereby valve 16 will reopen and valve 18 will reclose.

In operation of the hot water booster system of FIG. 1, the pump 12 will start when the collector temperature, as sensed by thermostat 56, reaches a preselected level, such as, for example, 100° F. If the temperature in tank 34 as measured by sensor 64 is higher than the collector temperature as measured by sensor 60 valve 18 will remain closed and valve 16 will be energized to open. Accordingly, the transfer fluid will be circulated through collector 10 and be heated and heat exchanger 14 will be short circuited. This mode of operation will allow the heat transfer fluid to be brought up to a higer temperature. When the temperature of the heat transfer fluid becomes higher than the tank temperature by a preselected amount, for example 20° F., valve 18 will be opened and valve 16 will be closed. The pump 12 will continue to run as long as the collector temperature stays above 100° and, with valve 18 open, the heat transfer fluid will be circulated through heat exchanger 14 and thermal energy will be transferred to the fluid in tank 34. Should the temperature of heat transfer fluid drop to a level where it is only slightly greater than the tank fluid temperature, for example 5° F. greater than the tank fluid temperature, valve 18 will again be closed and valve 16 opened as a result of the generation of an output signal by one-shot 74 in control 62. This will result, presuming that there is sufficient solar energy falling on collector 10 to maintain the temperature above the pump shut-off temperature level, in the heat exchanger again being short-circuited and the heat transfer fluid being circulated through the solar collector to increase its enthalpy. The tank thermostat 52 will cause the energization of heating element 48 when the tank temperature drops below a preselected level, for example 120° F., and thermostat 52 will cause the opening of switch 50 when the tank temperature exceeds 140° F.

Figure 2:
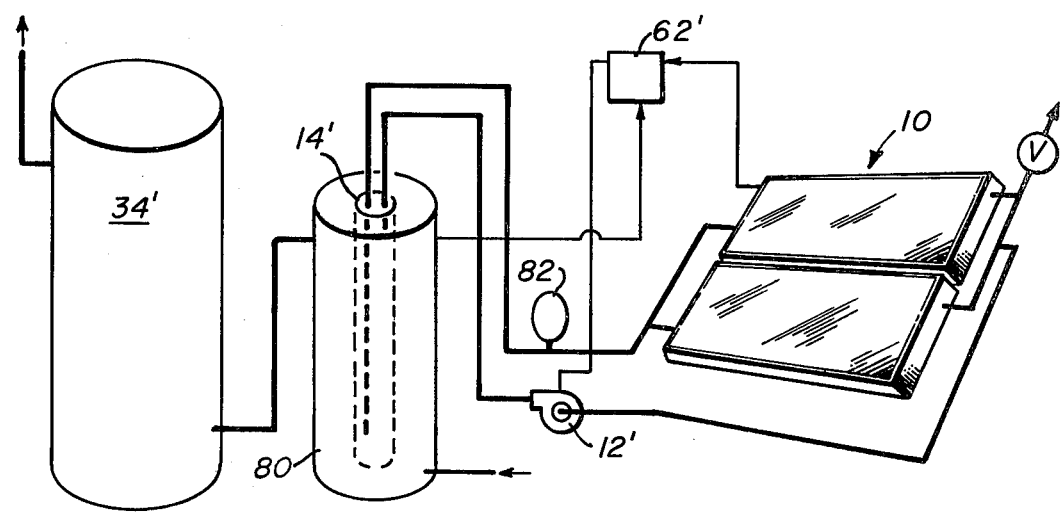
FIG. 2 is a schematic representation of a solar assisted hot water booster system in accordance with a second embodiment of the present invention.

A second embodiment of the invention is depicted in FIG. 2. In the FIG. 2 embodiment the heat exchanger 14′, rather than being mounted within tank 34′, is installed in a small preheater tank 80. Tank 34′ may be any commerically available electric or gas hot water heater. Heat exchanger 14′ may be identical to heat exchanger 14 of FIG. 1. In the embodiment of FIG. 2 either differential control 62 may be employed or pump 12 may be energized whenever the temperature of the heat transfer fluid in solar collector 10 exceeds either a predetermined level or the temperature of the fluid in tank 80 by a predetermined amount. In FIG. 2 a simple differential temperature control has been indicated at 62′. Control 62′ causes energization of pump 12′ whenever a preselected temperature differential exists between the heat transfer fluid in collector 10′ and the fluid to be heated in tank 80.

Figure 3:
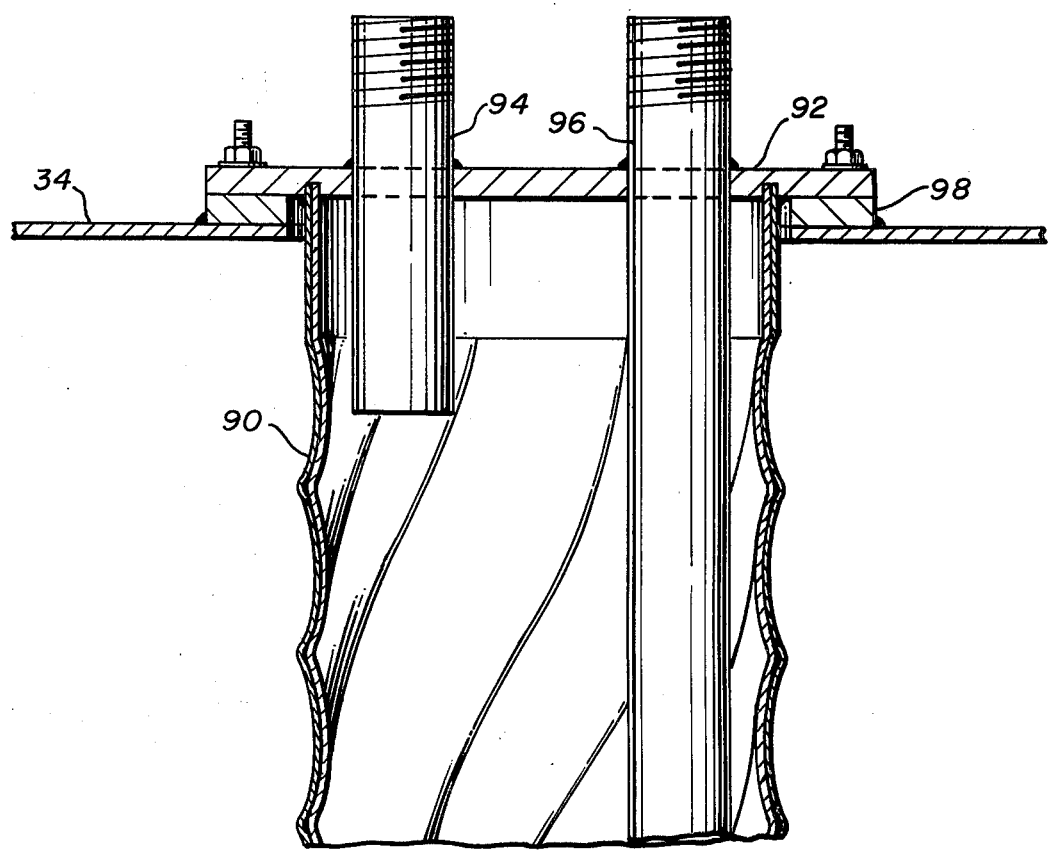
FIG. 3 is a partial cross-sectional side elevation view of a heat exchanger for use in the booster systems of FIGS. 1 and 2.

With reference now to FIG. 3, a portion of heat exchanger 14 is shown in greater detail. The heat exchanger comprises a commerically available spiral copper tube 90. Good results have been obtained employing a double tube configuration wherein both the inner and outer walls are of a spiral configuration. Tube 90 may, for example, have a four inch inner diameter and will, of course, be provided with a cap at its lower end. Tube 90 is brazed, at its upper end, to a disc shaped flange 92. Flange 92 is provided with a pair of passages which respectively accept a supply conduit 94 and a withdrawal conduit 96. Conduits 94 and 96 are brazed to flange 92. Supply conduit 94, as may best be seen from FIG. 3, terminates adjacent the top of tube 90 while withdrawal conduit 96 terminates adjacent the bottom of tube 90 as depicted in FIGS. 1 and 2. The heat exchanger is received in tank 34 via an opening in the tank top. An annular inner flange 98 is provided about the periphery of the opening in the top of tank 34 and flange 92 is bolted to flange 98 as shown. Accordingly, the heat exchanger may be withdrawn from tank 34 merely by releasing the bolts which interconnect flanges 92 and 98.

A high degree of heat exchange efficiency is realized through the use of the spiral tubing 90 for the heat exchanger. The heated fluid from collector 10 pumped into the heat exchanger via conduit 94 will, because of the wall configuration, swirl downwardly and the turbulence thus produced within the heat exchanger coupled with the enhanced wall surface area resulting from the spiral configuration of the tube will result in maximum transfer of heat from the heat exchange fluid to the walls of tube 90. Similarly, the spiral external shape will produce intimate mixing with the water to be heated.

While preferred embodiments have been shown and described various modifications and substitutions may be made thereto without departing from the spirit and scope of the invention. Accordingly, it is to be understood that the present invention has been described by way of illustration and not limitation.

What is claimed is:

1. A preheater for raising the enthalpy of a liquid comprising:

solar energy collector means, said collector means defining a flow path for a heat transfer liquid, thermal energy being transferred to said heat transfer liquid during circulation thereof through said collector means;

tank means, said tank means being adapted to have discharged thereinto adjacent a first end a second liquid which is to be heated, said tank means being provided with an outlet for said second liquid adjacent a second end thereof disposed oppositely of said tank means first end, said tank means further having an entrance aperture in the second end thereof;

rim means, said rim means being adapted to be affixed to the wall of said tank means about the periphery of said entrance aperture;

a disc, said disc having a shape commensurate with and a cross sectional area in excess of the tank means entrance aperture;

a metal tube supported at a first end from said disc, said metal tube having contoured inner and outer wall surfaces which define a spiral configuration to promote a swirling flow along said wall surfaces to maximize the transfer of heat from a fluid within said tube to a fluid in contact with the exterior of said tube;

an end cap affixed to and closing the second end of said tube;

means removably securing said disc to said rim means whereby said tube extends into said tank means;

a feed conduit, said feed conduit extending into said tube through said disc and terminating adjacent to the first end of said tube whereby fluid may be discharged into said tube at the first end thereof;

a fluid withdrawal conduit, said withdrawal conduit extending into said tube through said disc and terminating adjacent said end cap whereby fluid may be withdrawn from said tube at the second end thereof;

means connecting the interior of said tube in a closed heat transfer liquid circulation loop with said solar energy collector means, said connecting means being coupled to said feed and withdrawal conduits whereby heat transfer fluid will flow within said tube in counterflowing relationship with said second liquid exterior of said tube;

pump means for circulating the heat transfer liquid through said closed loop;

means for sensing the temperature of the heat transfer fluid and of the second liquid within said tank means; and means responsive to the sensed temperatures for energizing said pump means to circulate the heat transfer liquid through said tube when the temperature of the heat transfer liquid exceeds that of the second liquid in said tank means by predetermined amount.

2. The apparatus of claim 1 further comprising:

an auxiliary heater positioned within said tank means;

means responsive to the sensed temperature of the tank means second liquid for energizing said auxiliary heater when the temperature of the second liquid within said tank means falls below a predetermined level.

3. A preheater for raising the enthalpy of a liquid comprising:

solar energy collector means, said collector means defining a flow path for a heat transfer liquid, thermal energy being transferred to said heat transfer liquid during circulation thereof through said collector means;

tank means, said tank means being adapted to have discharged thereinto adjacent a first end a second liquid which is to be heated, said tank means being provided with an outlet for said second liquid adjacent a second end thereof disposed oppositely of said tank means first end;

a metal tube, said tube having contoured inner and outer wall surfaces;

a lower end cap affixed to and closing a first end of said tube;

flange means for removably mounting said tube to the wall of said tank means at the second end of said tank means, said tube being substantially entirely disposed within said tank means, said flange means and lower end cap cooperating to prevent leakage of fluid between the interior of said tank means and the interior of said tube;

a feed conduit, said feed conduit extending into said tube through said flange means and terminating adjacent the second end thereof;

a fluid withdrawal conduit, said withdrawal conduit extending into said tube through said flange means and terminating adjacent the first end thereof;

means for sensing the temperature of the heat transfer liquid and of the second liquid within said tank means;

means connecting the interior of said closed metal tube in a closed heat transfer liquid circulation loop with said solar energy collector means, said connecting means being coupled to said feed and withdrawal conduits and including:

bypass conduit means, said bypass conduit means including a first valve, said bypass conduit means permitting heat transfer liquid to be circulated through said solar energy collector without passing through said tube;

second valve means, said second valve means being connected in said closed circulation loop at the tube side of said bypass conduit means whereby the flow of heat transfer liquid through said tube may be selectively interrupted; and means for causing said bypass conduit means first valve to open and said second valve means to close when the temperature of said heat transfer liquid is below a predetermined level and for causing said bypass conduit means first valve to close and said second valve to open when the temperature of said heat transfer liquid exceeds the temperature of the second liquid in said tank means by a predetermined amount;

pump means for circulating the heat transfer liquid through said closed loop; and means responsive to the sensed temperatures for energizing said pump means to circulate the heat transfer liquid through said tube when the temperature of the heat transfer liquid exceeds that of the second liquid in said tank means by a predetermined amount.

4. The apparatus of claim 3 wherein said tube extends into said tank means through the top thereof and wherein the liquid to be heated is delivered to said tank means adjacent the bottom thereof and removed from said tank means adjacent the top thereof whereby the heat transfer liquid and the liquid within said tank means flow in generally opposite directions.

5. The apparatus of claim 4 wherein the contoured wall of said metal tube has a spiral configuration to promote a swirling flow along said wall to maximize the transfer of heat from said heat transfer liquid to the fluid in said tank means, the heat transfer liquid flowing downwardly within said tube.

6. The apparatus of claim 5 wherein said flange means includes:

rim means, said rim means being adapted to be affixed to the external wall of said tank means about the periphery of an entrance aperture provided in said tank means for insertion of said heat exchanger;

a disc, said disc having a shape commensurate with and a cross-sectional area in excess of the tank means entrance aperture, said feed and withdrawal conduits passing through said disc; and means removably securing said disc to said rim means.

7. The apparatus of claim 3 further comprising:

an auxiliary heater positioned within said tank means;

means responsive to the sensed temperature of the tank means second liquid for energizing said auxiliary heater when the temperature of the second liquid within said tank means falls below a predetermined level.

* * * * *